United States Patent [19]

Nakamura

[11] 4,423,438

[45] Dec. 27, 1983

[54] PROJECTION TYPE CATHODE RAY TUBE WITH MASKING MEANS

[75] Inventor: Yoshitaka Nakamura, Otsu, Japan

[73] Assignee: NEC Kansai, Ltd., Otsu, Japan

[21] Appl. No.: 338,205

[22] Filed: Jan. 11, 1982

[30] Foreign Application Priority Data

Feb. 26, 1981 [JP] Japan .............................. 56/27046[U]
Feb. 28, 1981 [JP] Japan ................................... 56/28668

[51] Int. Cl.³ .......................... H04N 5/74; H04N 9/31
[52] U.S. Cl. ...................................... 358/231; 358/60;
358/237; 358/238; 358/239
[58] Field of Search ................................ 358/60–63,
358/237–239, 231

[56] References Cited

U.S. PATENT DOCUMENTS

| | | | |
|---|---|---|---|
| 2,482,566 | 9/1949 | Traub | 358/239 |
| 2,567,745 | 9/1951 | Trad | 358/239 |
| 3,969,648 | 7/1976 | Hergenrother | 358/239 |
| 4,024,579 | 5/1977 | Hergenrother | 358/237 |

FOREIGN PATENT DOCUMENTS 2013974 8/1979 United Kingdom .

Primary Examiner—Michael A. Masinick
Attorney, Agent, or Firm—W. G. Fasse; D. H. Kane, Jr.

[57] ABSTRACT

A projection cathode ray tube is provided with elements for correcting a spherical aberration in the optical system. These elements include a correction lens disposed in front of the tube and a masking member adjustably mounted on the lens. The masking member partially covers peripheral surface portions of the lens in an adjustable manner to obtain a high image resolution on the screen with a minimum decrease in the image brightness. Preferably, the masking member is removable or adjustable in the form of a masking tape or divided shutter attached to partial portions of the front face of the lens for removing an undesired aberration with a minimized shuttering area. The projection tube comprises in combination with the correction lens, a tube envelope including a convex target and a concave mirror disposed opposite to each other and having the same center of curvature. This structure with the adjustable masking achieves a high quality reception or image projection.

10 Claims, 13 Drawing Figures

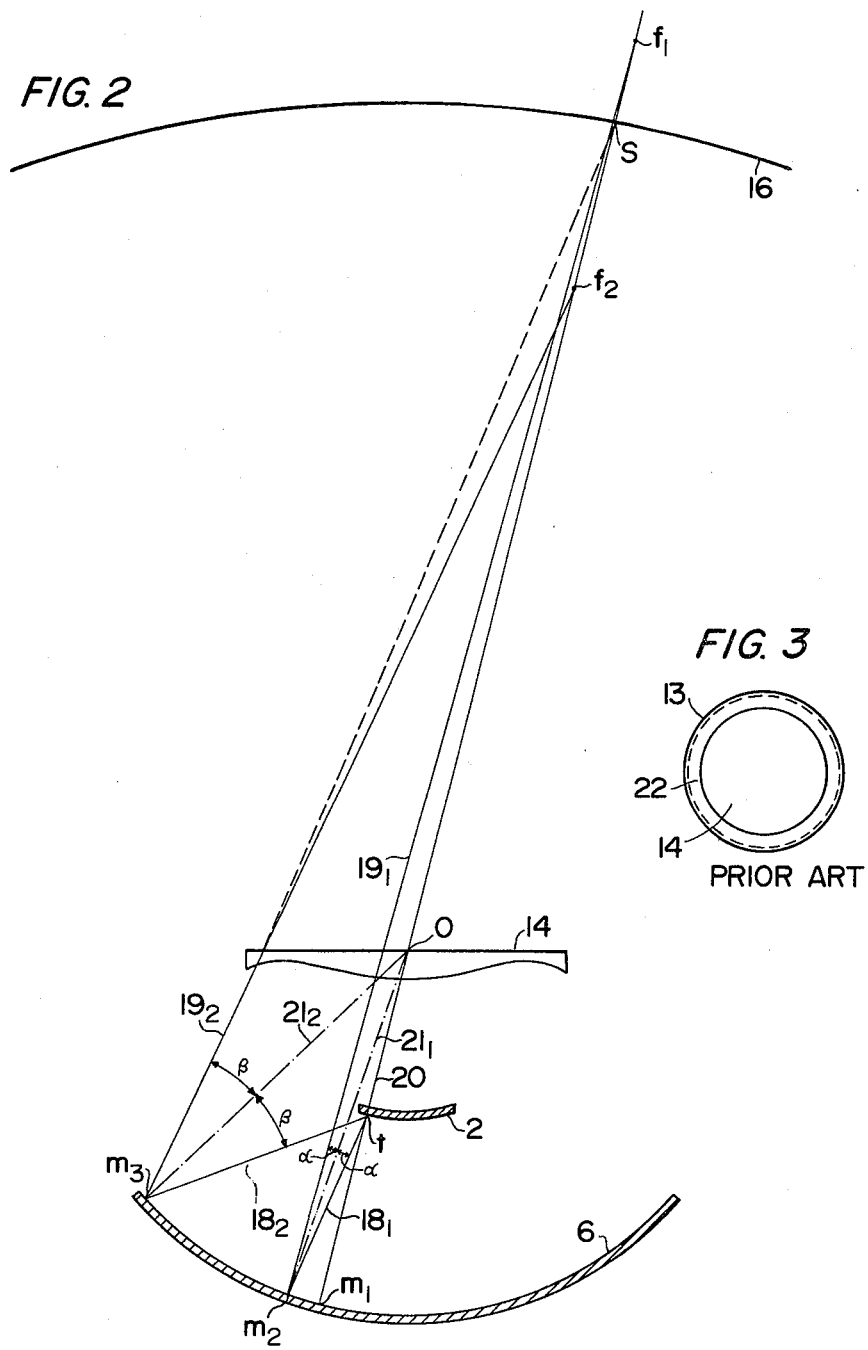

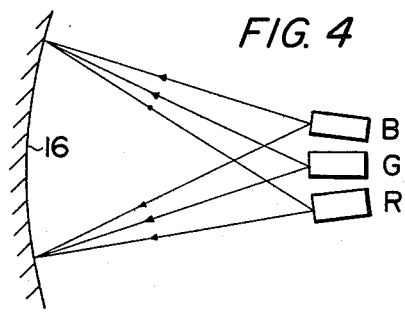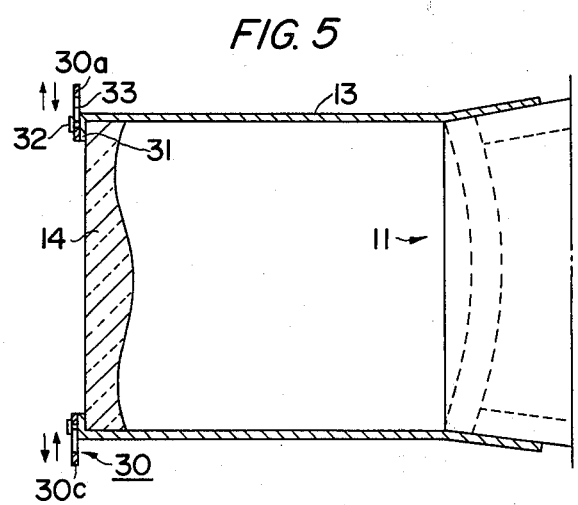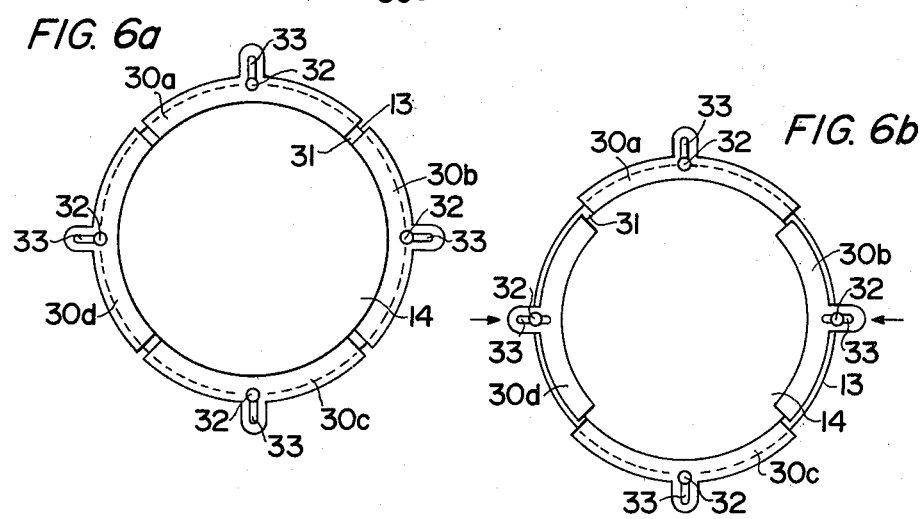

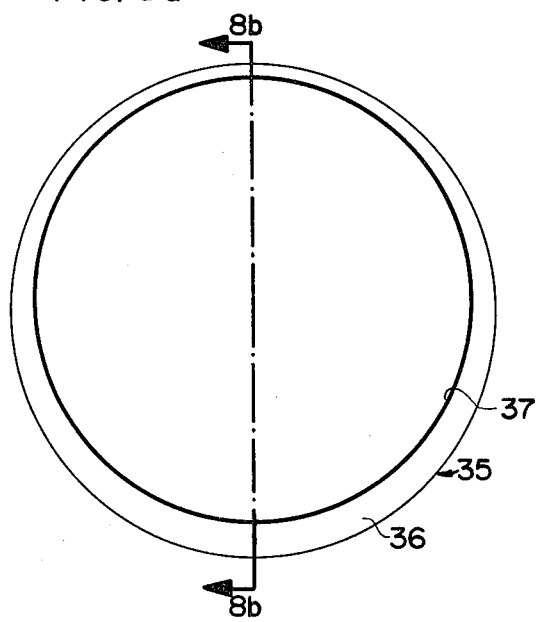
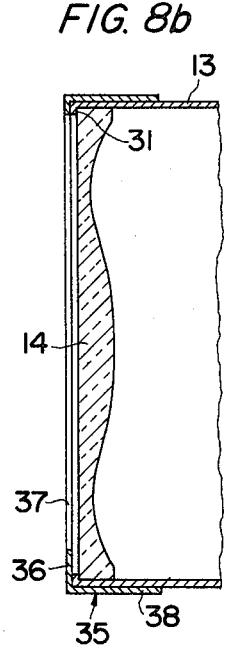
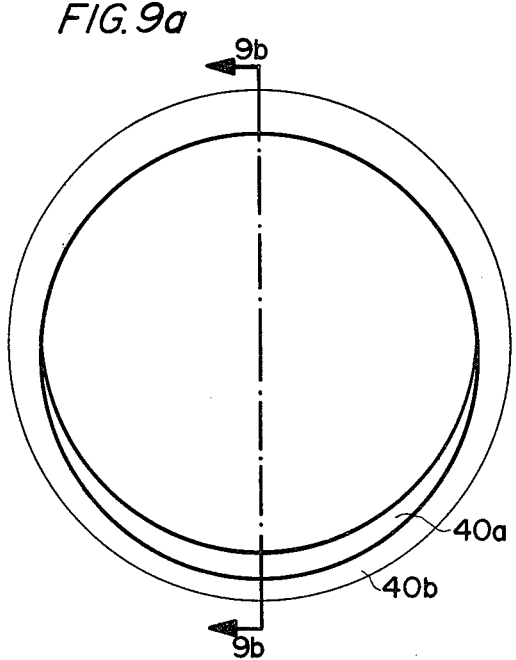
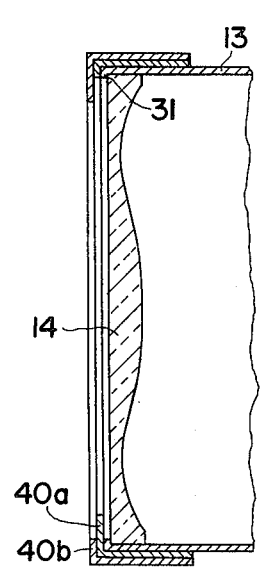

PROJECTION TYPE CATHODE RAY TUBE WITH MASKING MEANS

CROSS-REFERENCE TO RELATED APPLICATION

The present application corresponds to Japanese Utility Model Application No. 56-27046, filed in Japan on Feb. 26, 1981; and Japanese Patent Application No. 56-28668, filed in Japan on Feb. 28, 1981. The priority of the Japanese filing dates are claimed for the present application.

BACKGROUND OF THE INVENTION

The present invention relates to a cathode ray tube used for a reflection type projection display or television system such as a video projector.

U.S. Pat. No. 4,024,579 discloses a color projection television receiver and projector having three color tubes mounted in fixed relation and in predetermined location relative to a screen for projecting three color pictures in registration on the screen. Accurate registration of the pictures results from a projection tube structure adapted for this purpose, whereby field adjustment is minimized. The tube structure employs a mounting barrel accurately suspended within the evacuated envelope and supporting a phosphor-coated target and a projection mirror. A Schmidt correction lens is mounted externally of the envelope of each tube. There is room for improvement in such color tubes as will be described below.

Similar considerations apply to British Patent Publication No. 2,013,974 disclosing a projection television tube with a spherically curved phosphor screen and mirror mounted concentrically at the end of a cylindrical envelope wall by means of a concentrically shaped sealing edge. The screen may be mounted separately from the face plate, which may be plane.

A conventional projection tube as shown in FIG. 1 comprises a face plate 1 of the concentric meniscus type, a target 2 consisting of a metal backing 3 and a luminescent composition 4 disposed on the inner center portion of the face plate 1, an end plate 5 having a spherically concave inner surface, and a mirror 6 made by metal evaporation onto the inner surface of the end plate 5. From the center portion of the end plate 5, a neck 7 is extended outwardly along the longitudinal axis of the tube. The face plate 1 and the end plate 5 are sealed by means of a cylindrical member 8 having a given length so as to form an envelope 11. The inner surfaces of both plates 1, 5 and the axially facing edge surfaces of the housing member 8 are polished to align these parts relative to the same center of curvature, and are sealed with frit glass 9, 10 at each end of the housing member 8.

An electron gun 12 and an electron beam focusing coil 15 are affixed to the neck 7. A correction lens 14 for the spherical abberation caused by the mirror 6 is attached to a supporting frame 13 held in position in front of the face plate 1. The lens 14 such as of circular clear plastic lens serves to correct the spherical aberration, but a concentric meniscus lens may be used as a spherical aberration correcting means. A projection screen 16 is located in front of the lens 14.

In the operation of the prior art tube of FIG. 1, an electron beam 17 produced by the electron gun 12 is directed toward the target 2 to build an image thereon by scanning the electron beam. A light ray 18 of the image is reflected by the mirror 6, and a reflected ray 19 of light is passed through the face plate 1 and correction lens 14 so as to focus an enlarged image on the screen 16 set in the forward position of the tube.

As shown in FIG. 2, when a beam spot "t" of the image is formed at the target 2 on an optical axial line 20 produced between the spot "t" and a center O of curvature of the mirror 6, the ray $18_1$ of light from the beam sport "t" is reflected on the mirror 6 at a point $m_2$ near to a point $m_1$ positioned on the optical axial line t-O. The reflected ray $19_1$ of light advances symmetrically in a direction defined by an angle $\alpha$ to a normal line $21_1$ of the mirror surface and focuses at a focusing point $f_1$ formed by a crossing point between the line of the reflected light ray $19_1$ and the optical axial line 20 extended through points $m_1$, t and O. Similar to the above, another ray $18_2$ of light from the beam spot "t" is reflected at a point $m_3$ spaced from the point $m_1$ on the mirror 6, and the reflected light ray $19_2$ advances symmetrically in a direction defined by an angle $\beta$ to a normal line $21_1$ of the mirror surface to focus at a focusing point $f_2$ formed at the crossing point between the line of the reflected ray $19_2$ and the optical axial line 20.

Thus, many reflected rays of light caused by the beam spot "t" focus in every point within the fixed range along the optical axial line 20, and the focused images of the beam spot "t" become quite indistinct. However, arrangements to make the images distinct are achieved by the alignment of a spherical aberration correction lens 14 such as a Schmidt's lens as shown in FIG. 2 at the center O of curvature of the mirror 6 so as to refract reflected light rays $19_1$, $19_2$ at each point $m_2$, $m_3 \ldots$ on the mirror surface for focusing each reflected light ray into an image at a point "s" on the screen 16.

In this connection, the light ray reflected at the periphery of the mirror 6 has a large reflection angle compared with those of the center of the mirror. Thus, the spherical aberration becomes large. It was sometimes difficult to obtain a sufficiently distinct image or a good image resolution even by the use of the correction lens 14, when the spherical aberration becomes very large. This is also true if a slight distortion of sphericity of the mirror 6 occurs. In order to improve the image resolution, it has been proposed that at the top of the cylindrical supporting frame 13, a flange 22 extending inwardly and forming a diaphragm is provided to mask the periphery of the correction lens 14 so as to shield some of the rays which are reflected at the periphery of the mirror 6 with a large spherical aberration, please see FIGS. 1 and 3.

If the periphery of the correction lens 14 is masked by the flange 22, total light quantity passing through the correction lens 14 is, however, reduced. The resulting brightness decrease of the projection image onto the screen 16 causes considerable problems. The effective area for transmitting light may be calculated as follows. The diameter of the correction lens 14 is $2r_1$. The radial breadth of the flange 22 is "w". Thus, the effective light transmitting area $S_1$ of the correction lens 14 is represented by $S_1 = \pi r_1^2$ when the flange 22 is not used. When the flange 22 is attached the effective area is $S_2 = \pi(r_1 - w)^2$. Thus, the effective area $S_2/S_1$ is expressed by $S_2/S_1 = (r_1 - w)^2/r_1^2 = (1 - w/r_1)^2 = 1 - 2w/r_1$. This means that the use of the flange 22 decrease the transmitted light quantity by about $2w/r_1$. Assuming that the diameter $2r_1$ is 150 mm, and the breadth "w" is 10 mm, it follows that the brightness of the projection image is decreased by $2w/r_1 = 27\%$.

In addition, even if the target 2 formed on the face plate 1 and the mirror 6 formed on the end plate 5 are polished into perfect spherical surfaces, it has happened some times that the polished surfaces of the face plate 1 and of the end plate 5 will be slightly deformed when they are heated up to a high temperature in the frit sealing step for securing the plates 1 and 5 to the envelope 11. The deformation of the whole surface occurs seldom, but most of the deformations take place partially. It is noted that the mirror 6 tends to deform at the periphery rather than at the center so that the problem of the proper image resolution at the edge portion of the screen 16 becomes important.

In other words, the spherical aberration of the light ray 18 reflected at the periphery of the mirror 6, is larger than the aberration at the center of the mirror 6. Therefore, a larger degree of correction must be applied to the reflected ray 19 at the periphery as compared to that at the center. However, there is a certain limit for correcting the aberration due to the lower resolution of the image at the circumference of the screen 16. It may be proposed to use the wide flange 22 as an integral part of the supporting frame 13 as described above. The wide flange 22 covers the periphery of the correction lens 14 to shield the reflected ray of light passing through the peripheral portion of the correction lens 14, whereby this arrangement may contribute to improving the resolution of the image projected on the screen 16. However, another problem arises due to decreasing the image brightness on the screen because of the reduction of the effective aperture by covering the whole periphery of the correction lens 14 with the wide flange 22.

In a color projection television system a series of projection tubes B, G and R are arranged in front of the screen 16 to get blue, green and red color components as shown in FIG. 4. The projection tubes B and R for the blue and red color components are located to the right and left of the tube G and hence have different distances relative to the screen 16. Accordingly, the resolution will be reduced to different degrees by each of the tubes B and R at specific circumferential side edge portions of the screen 16.

OBJECTS OF THE INVENTION

In view of the above it is the aim of the invention to achieve the following objects singly or in combination:

to provide a new and improved projection cathode ray tube having a masking member for improving the image resolution while simultaneously restricting the brightness decrease;

to provide a new and improved cathode ray tube of the reflection type used for projection television systems by using aberration correcting means including masking or shuttering member for reflected light rays;

to provide a new and improved correcting means for the spherical aberration in the optical system combined with a projection cathode ray tube, wherein an undesired, reflected light ray is shielded adjustably by a correcting masking member; and to provide a new and improved cathode ray tube for use in a projection display system having an improved resolution without a minimum brightness decrease of the projected image on the screen.

SUMMARY OF THE INVENTION

In accordance with the present invention a projection cathode ray tube of the reflection type comprises in combination:

(a) an end plate provided with a spherically shaped mirror formed on the internal surface thereof;

(b) a neck sealed to the end plate and provided with electron beam generating means including an electron gun and a focusing coil;

(c) a face plate provided with a spherically shaped target deposited on the internal surface thereof and having a center of curvature of a sphere which defines the surface of said mirror;

(d) a cylindrical member secured integrally to the end plate and to the face plate;

(e) a correcting lens for correcting spherical aberration, held in spaced relation to the face plate by a supporting frame sealed to the face plate and aligned with respect to the mirror and target;

(f) a masking member secured to the correction lens, wherein the masking member serves to remove undesired parts of reflected rays of light so as to improve the resolution of the projection image on a screen, whereby the masking member is attached by adjustable means in an adjustable manner to maintain a minimum shielding area and to obtain optimum brightness on the screen.

In other words, a cathode ray tube of the reflection type is equipped with spherical aberration correction means which comprises a correction lens disposed in front of the tube and a masking member mounted on the lens member. The masking member covers partially peripheral areas of the lens to obtain a high image resolution on the screen with a minimum brightness decrease. The masking member comprises removable and area adjustable means such as tape, paint or divided segments of opaque materials to prevent the transmission of light. Therefore, the image on the target due to scanning of the electron beam is projected onto the screen with a high resolution and without any considerable decrease in the brightness of the image.

BRIEF FIGURE DESCRIPTION

In order that the invention may be clearly understood, it will now be described, by way of example, with reference to the accompanying drawings, wherein:

FIG. 2 is an enlarged schematic view illustrating the relation among rays of light in the tube of FIG. 1;

FIG. 3 is a plan view of the tube of FIG. 1;

FIG. 4 is a schematic view explaining a color projection system using the tube of FIG. 1;

FIG. 5 is a partial side view of a projection cathode ray tube of an embodiment according to the present invention;

FIGS. 6a and 6b show plan views of the front face of the tube of FIG. 5, to illustrate differently adjusted positions of a masking member;

FIGS. 8a and 8b show a front plan view and a sectional view respectively of another embodiment of a masking member according to the invention; and FIGS. 9a and 9b show a front plan view and a sectional view respectively of yet another modification of a masking means according to the invention.

DETAILED DESCRIPTION OF PREFERRED EXAMPLE EMBODIMENTS AND OF THE BEST MODE OF THE INVENTION

Figure 1:
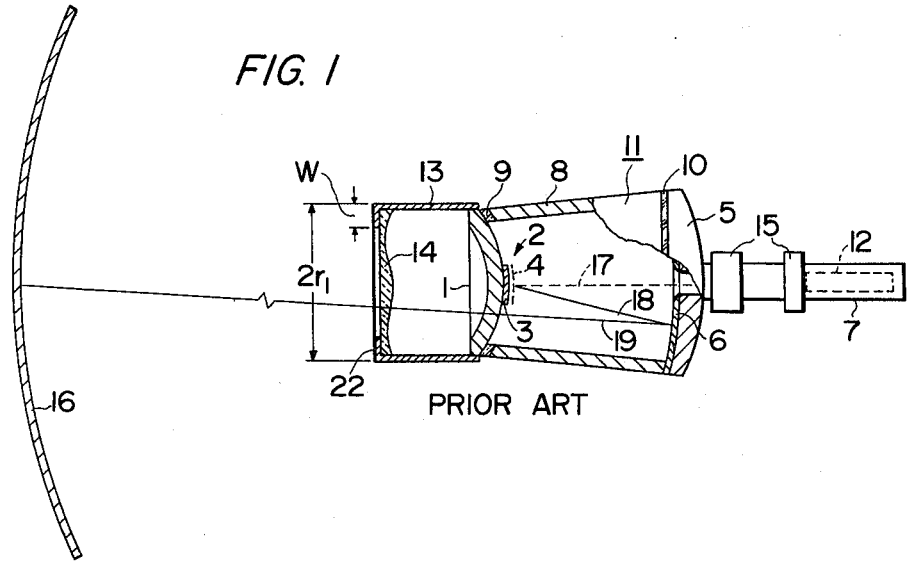
FIG. 1 is a schematic view of a conventional projection cathode ray tube shown partially in a longitudinal section.

A prior art projection cathode ray tube has been generally described above with reference to FIGS. 1 to 4. An improved cathode ray tube of the reflection type according to the present invention will be explained by referring to FIGS. 5 and 6. FIG. 5 shows a somewhat enlarged sectional view of the improved means for correcting a spherical aberration, and FIGS. 6a and 6b show different plan views of correction means of FIG. 5. The same reference numbers are used for the same parts as in FIG. 1.

The embodiment of FIG. 5 comprises correction means including the correction lens 14 and an adjustable shutter 30 operable as a masking member. The shutter is divided into quarter segments 30a to 30d. Each of the segments of the shutter 30 is arranged to cover a corresponding quarter section that is 90° sectional areas of the front periphery of the correction lens 14. Each segment of the shutter 30 is supported in such a manner that it is capable of independent movement relative to the other segments. Attachment of each of the segments 30a, 30b, 30c and 30d of the shutter 30 is accomplished by means of a narrow flange 31 provided at the left hand end of a supporting frame 13 of the correction lens 14 and by means of four pins 32 projecting from the front surface of the narrow flange 31 at equal angular spacings. An elongated hole 33 is provided in each of the segments 30a, 30b, 30c and 30d. Thus, each segment of the shutter 30 may be freely adjusted in its position in the radial direction at the front periphery of the correction lens 14 as illustrated in FIGS. 6a and 6b.

Each of the shutter segments 30a, 30b, 30c and 30d is first moved in the radially outward direction so that the inner edge of each segment coincides with the inner edge of the narrow flange 31 which has no shielding function. Then, the operation of the cathode ray tube is tested by projecting an image on the screen 16. For this test it is recommended to use a standard pattern such as a cross stripe pattern which is used for ordinary television setting adjustments. In this operation, locations of poor resolution and image distortion are checked at the projected circumferential image on the screen 16. For instance, if two locations of poor resolution are found, related segments of the shutter 30 are moved inwardly while observing the locations of poor resolution. When agreeable positions of two segments, for example, 30b and 30d are located, the resolution of these two locations is improved and the brightness drop is suppressed to a desirable degree. Then the adjusted segments 30b and 30d are fixed in their adjusted position. For this purpose the four pins may be threaded screw bolts. It is not necessary to move the segments 30a and 30c at all, which are related to the places of the image originally having a good resolution, and thus excess shielding of rays of light passing through the periphery of the correcting lens 14 can be avoided, and a large reduction in brightness is prevented according to the invention.

Figure 7A:
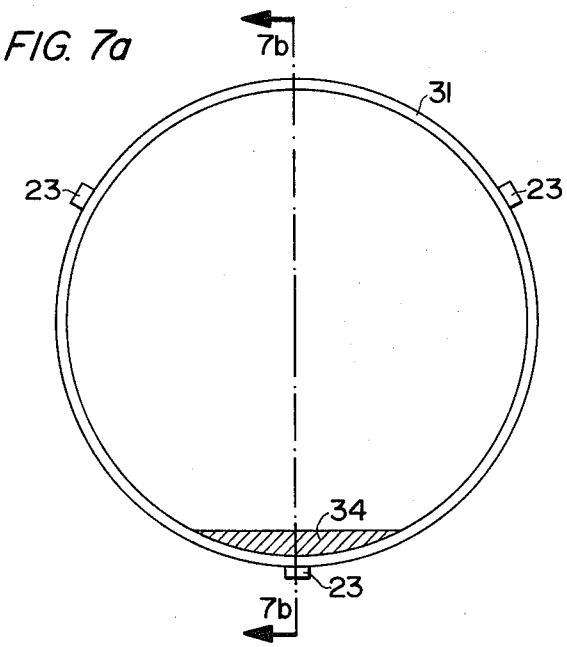
FIGS. 7a and 7b show a front plan view and a sectional view respectively of a masking member of another embodiment according to the present invention.
Figure 7B:
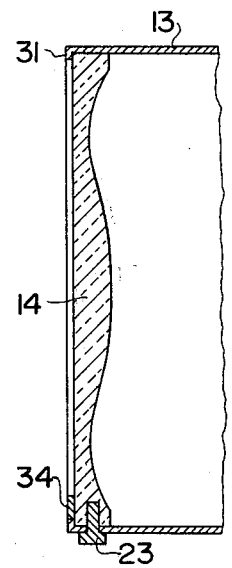

FIGS. 7a and 7b show another embodiment in accordance with the present invention, in which FIG. 7a is a plan view and FIG. 7b is a cross-section taken along the line 7b—7b of FIG. 7a. In this embodiment the projection cathode ray tube is provided with a narrow flange 31 which does not function as an iris diaphragm as shown in FIGS. 6a and 6b. The flange 31 is secured to the cylindrical supporting frame 13. A masking member 34 is secured to the external surface of the correction lens 14. The correction lens 14 is secured to the cylindrical supporting frame 13 by means of a screw 23. In a testing operation of this cathode ray tube, a predetermined standard pattern such as a lattice shape pattern is projected on the screen 16 to find portions of poor resolution. When a corresponding undesired portion on the correction lens 14 is found, the masking member 34 is secured on the underside portion to shield or prevent transmission of light. The masking area for shielding out rays of light thus becomes necessarily a minimum, whereby a high resolution projection type cathode ray tube may be provided with a minimum brightness decrease. The masking member 34 is made of materials which are impermeable to light, such as of adhesive tape cut to desirable length or definite shape, or the masking area is coated with paint.

FIGS. 8a and 8b show a further embodiment of the present invention in which FIG. 8a is a plan view and FIG. 8b is a section taken along the line 8b—8b. In this embodiment, a narrow flange 31 is provided at the front end of the cylindrical supporting frame 13 to hold the lens 14, but not to the extent that it could function as a masking diaphragm. A movable ring 35 functions as a masking member for shielding a partial portion of the correction lens 14. The ring 35 is disposed on the cylindrical supporting frame 13. The movable ring 35 comprises a disk 36 having an eccentric aperture 37 and a cylindrical part 38 attached at a right angle to the circumference of the disk 36. In the same manner as in FIGS. 6 and 7, the movable ring 35 is rotated for adjustment into the best position to get the most distinct image on the screen 16. After adjustment the cylindrical part 38 is secured to the cylindrical supporting frame 13, for example by set screws, not shown. According to this embodiment, by only turning the movable ring 35, the size of the partially shuttered portion of the spherical aberration correction lens 14 is determined as desired so that any brightnes decrease is limited while the image resolution can be improved.

FIGS. 9a and 9b show a modification of the cathode ray tube of FIGS. 8a and 8b. This modification uses a plurality of masking ring members 40a, 40b fitted coaxially on the cylindrical supporting frame 13. Each masking movable ring member 40a and 40b can be turned and fixed independently of the other in any desirable position. Thus, these ring members 40a and 40b are able to shield a plurality of selected portions or surface areas on the correction lens so that the resolution of the image on the screen can be improved quite satisfactorily.

The masking means shown in FIGS. 7 to 9, may be composed of disks only to be adjustably held by the elongated cylindrical supporting frame 13. Moreover, the eccentric aperture 37 may be replaced by an elliptical or a rectangular aperture or the like.

The present invention has been described with reference to a projection type cathode ray tube in which the target 2 and the mirror 6 are directly attached to the internal surface of the tube envelope 11, as shown in the above mentioned British Patent Application GB No. 2,013,974. However, the present invention may also be effectively applied to another projection type cathode ray tube, as shown in the above mentioned U.S. Pat. No. 3,969,648, wherein a separate assembly is prepared beforehand, in which a mirror is fixed to one end of a cylindrical metallic member, then the separate assembly is enclosed in a tube envelope.

Although the invention has been described with reference to specific example embodiments it will be appreciated that it is itended to cover all modifications and equivalents within the scope of the appended claims.

What is claimed is:

1. In a projection cathode ray tube including a convex target formed on a face plate, a concave mirror formed on an end plate, said target and said mirror being provided with the same center of curvature and arrangement to reflect light of an image on said target with said mirror, and a spherical aberration correcting means secured in front of said face plate, the improvement wherein said correcting means comprises a correction lens member for correcting spherical aberration and a masking member in the form of a movable masking ring for removing a reflected light ray by shielding a partial portion of said correction lens member, said movable masking ring having an eccentric aperture and means movably securing said movable masking ring only to a partial predetermined area of said correction lens member so as to improve the resolution of a projected image on a screen.

2. A projection cathode ray tube, comprising in combination:
   (a) an end plate provided with a spherically shaped mirror formed on the internal surface of said end plate and having a given curvature;
   (b) a neck sealed to said end plate and provided with electron gun means and electron focusing means;
   (c) a face plate provided with a spherically shaped target deposited on the internal surface of said face plate, said target having a center of curvature of a sphere defining the surface of said mirror with said given curvature;
   (d) a cylindrical member secured integrally to said end plate and to said face plate;
   (e) a correcting lens member held in spaced relation to said face plate by support means seated on said face plate, said correcting lens member being aligned with respect to said mirror and said target; and
   (f) masking means in the form of movable masking ring means having an eccentric aperture, said movable masking ring means being adjustably mounted on said correcting lens member in such a manner as to cover predetermined partial surface areas of said correcting lens member for improving the resolution of a projected image without substantially reducing the brightness.

3. The cathode ray tube of claim 2, wherein said movable masking ring means is made of materials for preventing the light transmission through masked areas of said correcting lens member.

4. The cathode ray tube of claim 2, wherein said movable masking ring means comprise an adjustable shutter divided into a plurality of shutter ring segments, each of said shutter ring segments being movably attached to the periphery of said correcting lens member.

5. The cathode ray tube of claim 2, further comprising means (23) for securing said masking ring means in an adjusted position.

6. The cathode ray tube of claim 2, wherein said masking ring means comprise a plurality of movable rings fitted coaxially to said correcting lens member.

7. A projection cathode ray tube system comprising, at least one cathode ray tube,
   (a) an end plate provided with a spherically shaped mirror formed on the internal surface of said end plate and having a given curvature;
   (b) a neck sealed to said end plate and provided with electron gun means and electron focusing means;
   (c) a face plate provided with a spherically shaped target deposited on the internal surface of said face plate, said target having a center of curvature of a sphere defining the surface of said mirror with said given curvature;
   (d) a cylindrical member secured integrally to said end plate and to said face plate;
   (e) a correcting lens member held in spaced relation to said face plate by support means seated on said face plate, said correcting lens member being aligned with respect to said mirror and said target; and
   (f) masking means adjustably mounted on said correcting lens member in such a manner as to cover predetermined partial surface areas of said correcting lens member for improving the resolution of a projected image without substantially reducing the brightness, said masking means comprising an adjustable shutter divided into a plurality of segments, individual pin means (32) and hole means (33) for adjustably attaching each of said segments to the periphery of said correcting lens member and for individually adjusting each of said segments independently from the other shutter segments.

8. The cathode ray tube system of claim 7, wherein said shutter segments are made of materials for preventing the light transmission through masked areas of said correcting lens member.

9. The cathode ray tube system of claim 7, comprising four shutter segments each covering about 90° of the front periphery of said correction lens member.

10. The cathode ray tube system of claim 7, comprising three cathode ray tubes (B, G, R), and a common screen, said three cathode ray tubes being mounted in fixed relation to said common screen.

* * * * *